United States Patent
Singh et al.

(10) Patent No.: US 12,549,224 B1
(45) Date of Patent: Feb. 10, 2026

(54) RECONFIGURABLE INTELLIGENT SURFACE WITH VARIABLE AMPLIFICATION AND ATTENUATION INCLUDING ANGLE OF ARRIVAL ESTIMATION OF WIRELESS SIGNALS

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/797,975

(22) Filed: Aug. 8, 2024

(51) Int. Cl.
  *H04B 7/04* (2017.01)
  *H01Q 13/08* (2006.01)
  *H04B 7/0456* (2017.01)

(52) U.S. Cl.
  CPC ......... *H04B 7/04013* (2023.05); *H01Q 13/08* (2013.01); *H04B 7/0465* (2013.01)

(58) Field of Classification Search
  CPC . H04B 7/040013; H04B 7/0465; H01Q 13/08
  See application file for complete search history.

(56) References Cited

U.S. PATENT DOCUMENTS

| | | |
|---|---|---|
| 10,770,790 B1 | 9/2020 | Mahanfar |
| 11,329,375 B1 | 5/2022 | West et al. |
| 11,855,745 B2 | 12/2023 | Schloemer |
| 2016/0112117 A1 | 4/2016 | Platzer et al. |
| 2019/0334228 A1* | 10/2019 | Haridas .............. H01Q 21/0025 |
| 2022/0026524 A1 | 1/2022 | Maruyama et al. |
| 2022/0231411 A1 | 7/2022 | Lin |

(Continued)

FOREIGN PATENT DOCUMENTS

CN 117768269 A 3/2024

OTHER PUBLICATIONS

Qorvo.com, "CMD262 26-28 GHz (Ka Band) GaN Power Amplifier", Rev-A, URL—https://www.qorvo.com/products/p/CMD262, Jun. 14, 2022, 1 page.

(Continued)

*Primary Examiner* — Sung S Ahn
(74) *Attorney, Agent, or Firm* — Amin, Turocy & Watson, LLP

(57) ABSTRACT

The technology described herein is directed towards a reconfigurable intelligent surface that receives and redirects incoming electromagnetic signals based on power efficient subarrays of unit cells. Each subarray integrates a power amplifier and tunable attenuator device to selectively amplify and/or selectively attenuate the reflected signal. For example, the power amplifier and tunable attenuator device can be shared by a m×n (e.g., 3×3) subarray of unit cells, which can be arranged as a module of a larger reconfigurable intelligent surface. Proper impedance matching between the power amplifier and the reconfigurable intelligent surface elements is maintained by using a matching circuit to minimize signal reflection. The system design thus facilitates receiving and reflecting the electromagnetic signal by coupling the RF energy, processing, amplifying, and attenuating. The technology further facilitates estimation of the angle of arrival of the incoming signal.

20 Claims, 15 Drawing Sheets

(56) References Cited

U.S. PATENT DOCUMENTS

| | | |
|---|---|---|
| 2023/0142735 A1 | 5/2023 | Raghavan et al. |
| 2024/0014862 A1 | 1/2024 | Duan et al. |
| 2024/0364019 A1 | 10/2024 | Hussain |
| 2025/0062529 A1 | 2/2025 | Nathan et al. |
| 2025/0125525 A1 | 4/2025 | Rossanese et al. |
| 2025/0274088 A1* | 8/2025 | Khaira ................ H03F 3/245 |
| 2025/0274165 A1 | 8/2025 | Manolakos et al. |

OTHER PUBLICATIONS

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.

Long et al., "Active Reconfigurable Intelligent Surface Aided Wireless Communications", IEEE Transactions on Wireless Communications, vol. 20, No. 8, Aug. 2021, pp. 4962-4975.

Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.

Gros et al., "A Reconfigurable Intelligent Surface at mmWave Based on a Binary Phase Tunable Metasurface", IEEE Open Journal of the Communications Society, vol. 2, 2021, pp. 1055-1064.

Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.

Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.

Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.

Ojaroudi et al., "Graphene-Based Reconfigurable Intelligent Meta-Surface Structure for THz Communications", 15th European Conference on Antennas and Propagation, 2021, 5 pages.

Tasci et al., "A New RIS Architecture With a Single Power Amplifier: Energy Efficiency and Error Performance Analysis", IEEE Access, Apr. 2022, 11 pages.

Bai et al., "RIS-Assisted Green Secure Communications: Active RIS or Passive RIS?", IEEE Wireless Communications Letters, Dec. 6, 2022, 5 pages.

Goldman et al., "SpaceX and T-mobile Focus on Direct Satellite-to-Smartphone to Improve Mobile Coverage in Remote Areas", Analysys Mason, Aug. 2022, 5 pages.

Jewett, Rachel, "How Big is the Satellite Industry's Direct-to-Device Opportunity?", Via Satellite, Sep. 12, 2023, Url—https://www.satellitetoday.com/connectivity/2023/09/12/how-big-is-the-satellite-industrys-direct-to-device-opportunity/, Retrieved from the internet Dec. 2, 2024, 4 pages.

"Electromagnetic Metasurface", Wikipedia, URL—https://en.wikipedia.org/wiki/Electromagnetic_metasurface#, Retrieved from the internet Dec. 2, 2024, 9 pages.

Schweber, Bill., "The Doppler Effect: From Highly Ridiculed to Absolutely Indispensable, Part 1", Electrical Engineering News and Products, Apr. 19, 2022, URL—https://www.eeworldonline.com/the-doppler-effect-from-highly-ridiculed-to-absolutely-indispensable-part-1/, Retrieved from the internet Dec. 2, 2024, 14 pages.

"Doppler Effect", Wikipedia, URL—https://en.wikipedia.org/wiki/Doppler_effect, Retrieved from the internet Dec. 2, 2024, 8 pages.

Long et al., "A Promising Technology for 6G Wireless Networks: Intelligent Reflecting Surface", Journal of Communications and Information Networks, vol. 6, No. 1, Mar. 2021, 16 pages.

Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.

Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.

Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.

3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.

3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.

3GPP TS 38.108 V17.0.0, 3rd Generation Partnership Project; Technical Specification Group Radio Access Network; NR; Satellite Access Node radio transmission and reception, (Release 17), Jun. 2022, 58 pages.

"DVB", Wikipedia, URL—https://en.wikipedia.org/wiki/DVB, Retrieved from the internet Dec. 2, 2024, 12 pages.

"DVB-S", Wikipedia, URL—https://en.wikipedia.org/wiki/DVB-S, Retrieved from the internet Dec. 2, 2024, 2 pages.

"DVB-S2", Wikipedia, URL—https://en.wikipedia.org/wiki/DVB-S2, Retrieved from the internet Dec. 2, 2024, 7 pages.

"DVB-S2X", Wikipedia, URL—https://en.wikipedia.org/wiki/DVB-S2X, Retrieved from the internet Dec. 2, 2024, 2 pages.

The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.

Dvb org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.

Dvb org., "Second Generation Framing Structure, Channel Coding and Modulation Systems for Broadcasting, Interactive Services, News Gathering and Other Broadband Satellite Applications; Part 2: DVB-S2 Extensions (DVB-S2X)", DVB Document A083-2 Rev.4, Feb. 2024, 166 pages.

"Facts and Figures 2022—Mobile Network Coverage 2022", ITU, URL—https://www.itu.int/itu-d/reports/statistics/2022/11/24/ff22-mobile-network-coverage/, Retrieved from the internet Dec. 2, 2024, 4 pages.

Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.

ETSI EN 300 421 V1.1.2, "Digital Video Broadcasting (DVB); Framing Structure, Channel Coding and Modulation for 11/12 Ghz Satellite Services", Aug. 1997, 24 pages.

ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.

ETSI EN 302 307 V1.2.1, Digital Video Broadcasting (DVB); Second Generation Framing Structure, Channel Coding And Modulation Systems for Broadcasting, Interactive Services, News Gathering and Other Broadband Satellite Applications (DVB-S2), Aug. 2009, 78 pages.

ETSI TR 102 376-1 V1.2.1, "Digital Video Broadcasting (DVB); Implementation Guidelines for the Second Generation System For Broadcasting, Interactive Services, News Gathering and other Broadband Satellite Applications; Part 1: DVB-S2", Nov. 2015, 118 pages.

ETSI TR 102 376-2 V1.2.1, "Digital Video Broadcasting (DVB); Implementation Guidelines for the Second Generation System for

(56) References Cited

OTHER PUBLICATIONS

Broadcasting, Interactive Services, News Gathering and other Broadband Satellite Applications; Part 2: S2 Extensions (DVB-S2X)", Jan. 2021, 212 pages.

Lee et al., "Integrated DVB-X2 Receiver Architecture with Common Acceleration Engine", Applied Sciences, vol. 9, No. 3983, Sep. 23, 2019, 16 pages.

Nemer, Elias., "Physical Layer Impairments in DVB-S2 Receivers", Second IEEE Consumer Communications and Networking Conference, 2005, pp. 487-492.

Dvb org., "White Paper on the use of DVB-S2X for DTH applications, DSNG & Professional Services, Broadband Interactive Services and VL-SNR applications", DVB Document A172, Mar. 2015, 16 pages.

Babcock, Stephen., "AT&T Invested $450M in Maryland Network Upgrades Over 3 Years", Technical.ly, URL—https://technical.ly/startups/att-invested-450m-in-maryland-network-upgrades-over-3-years/, Jul. 9, 2019, Retrieved from the internet Dec. 2, 2024, 7 pages.

Tyree et al., "AT&T Providing Cell on Wheels to Help with Internet Connection at LU's Graduation", URL—https://wset.com/news/local/att-providing-cell-on-wheels-to-help-with-internet-connection-at-lus-graduation, May 10, 2017, Retrieved from the internet Dec. 2, 2024, 6 pages.

ITU, "H.222.0 : Information Technology—Generic Coding of Moving Pictures and Associated Audio Information: Systems", International Telecom Union, Aug. 2018, 306 pages.

Cioni et al., "DVB-S2X Physical Layer Performance Results Over Realistic Channel Models", International Journal of Satellite Communications and Networking, vol. 34, No. 3, Jul. 2015, 21 pages.

"MPEG Transport Stream", Wikipedia, URL—https://en.wikipedia.org/wiki/MPEG_transport_stream, Retrieved from the internet Dec. 2, 2024, 10 pages.

Keese, Col. John E., "Satellite Telemetry, Tracking and Control Subsystems", Massachusetts Institute of Technology, Oct. 29, 2003, 35 pages.

NASA, "State-of-the-Art of Small Spacecraft Technology", NASA 9.0 Communications, Feb. 12, 2024, 32 pages.

Stuhlfauth, Reiner. "5G NTN Takes Flight: Technical Overview of 5G Non-Terrestrial Networks", Rohde & Schwarz, White Paper, Version 01.00, 2022, 124 pages.

Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.

"Aerial SDK Layer 1" Nvidia Docs Hub, https://docs.nvidia.com/aerial/archive/aerial-sdk/23-1/text/product_brief/aerial_sdk_layer_1.html] retrieved Jan. 16, 2025, 30 pages.

Healy, et al. "Layer-1 Physical Interface Transcoder Leveraging Metasurfaces" U.S. Appl. No. 18/899,886, filed Sep. 27, 2024, 63 pages.

Healy, et al. "Connecting Wi-Fi-Enabled Device to Non-Terrestrial Satellite Constellations" U.S. Appl. No. 18/899,909, filed Sep. 27, 2024, 55 pages.

Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.

Healy, et al. "Universal Layer-1 Physical Interface Transcoder for Terrestrial and Non-Terrestrial Air-Interfaces" U.S. Appl. No. 18/899,739, filed Sep. 27, 2024, 62 pages.

Singh, et al. "Metasurface Integrated Non-Terrestrial Network Transcoder With Adaptive Slicing for Dynamic Allocation of Mesh Resources" U.S. Appl. No. 18/902,100, filed Sep. 30, 2024, 64 pages.

Singh, et al. "Edge Computing and Metasurfaces in Non-Terrestrial Network-Connected Transcoder Nodes" U.S. Appl. No. 18/902,158, filed Sep. 30, 2024, 66 pages.

Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.

Singh, et al. "Allocating Primary and Secondary Metasurface Integrated Non-Terrestrial Network Transcoder Nodes" U.S. Appl. No. 18/902,360, filed Sep. 30, 2024, 64 pages.

Healy, et al. "Model-Controlled Layer-1 Physical Interface Transcoder to Support Hybrid Terrestrial and Non-Terrestrial Ground and Space Mesh Network" U.S. Appl. No. 18/899,504, filed Sep. 27, 2024, 64 pages.

Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.

Singh, et al. "Secure Non-Terrestrial Network Links Utilizing Quantum Key Distribution Integrated Into a Metasurface Transcoder Node With Hardware Polarization Control" U.S. Appl. No. 18/902,422, filed Sep. 30, 2024, 37 pages.

Singh, et al. "Signal Correction Based On Environmental Factors in Metasurfaces for Non-Terrestrial Network Transcoder Nodes" U.S. Appl. No. 18/902,454, filed Sep. 30, 2024, 53 pages.

Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

Khaira, et al. "Energy-Efficient Active Reconfigurable Intelligent Surface With Selective Amplification" U.S. Appl. No. 18/609,134, filed Mar. 19, 2024, 39 pages.

Singh, et al. "Reconfigurable Intelligent Surface Integrated On Compact Drones for Wireless Network Survey" U.S. Appl. No. 18/913,434, filed Oct. 11, 2024, 36 pages.

Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.

Singh, et al. "Reconfigurable Intelligent Surfaces That Self Heal and Adapt by Altering the Tile Geometry" U.S. Appl. No. 18/656,431, filed May 6, 2024, 74 pages.

Singh, et al. "Predictive Signal Boosting in Distributed Tile Controllers for Reconfigurable Metasurfaces" U.S. Appl. No. 18/656,441, filed May 6, 2024, 54 pages.

Ye, et al. "Enhancing Non-Terrestrial Network Direct-to-Everything Service With Metasurfaces" U.S. Appl. No. 18/739,880, filed Jun. 11, 2024, 39 pages.

Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.

Healy, et al. "Transcoding the Air-Interface Between Non-Terrestrial and Terrestrial Networks Leveraging Integrated Transcoder and Metasurface Mounted on a Drone" U.S. Appl. No. 18/780,254, filed Jul. 22, 2024, 61 pages.

Healy, et al. "Communication Between Non-Terrestrial and Terrestrial Networks Based on Layer-1 Physical Packet-Level Transcoding" U.S. Appl. No. 18/780,269, filed Jul. 22, 2024, 59 pages.

Notice of Allowance received for U.S. Appl. No. 18/609,134 dated Sep. 16, 2025, 11 pages.

Non-Final Office Action received for U.S. Appl. No. 18/656,441 dated Sep. 22, 2025, 7 pages.

Notice of Allowance received for U.S. Appl. No. 18/656,441 dated Nov. 19, 2025, 5 pages.

Notice of Allowance received for U.S. Appl. No. 18/739,880 dated Nov. 12, 2025, 10 pages.

\* cited by examiner

RECONFIGURABLE INTELLIGENT SURFACE WITH VARIABLE AMPLIFICATION AND ATTENUATION INCLUDING ANGLE OF ARRIVAL ESTIMATION OF WIRELESS SIGNALS

BACKGROUND

Reconfigurable intelligent surfaces (alternatively referred to as intelligent reflective surfaces, or metasurfaces) are man-made thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal. Because of their ability to alter the attributes of signals reflected at the surface, intelligent reflective surfaces are being evaluated for use in beyond fifth generation (B5G) and sixth generation (6G) wireless communication and wireless sensing networks.

In communications assisted by a reconfigurable intelligent surface, signal strength at the receiver is significantly constrained by the distance the signal needs to travel. Increasing the size of the reconfigurable intelligent surface is a common method to counteract free-space signal loss, but this can be costly and energy-intensive.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
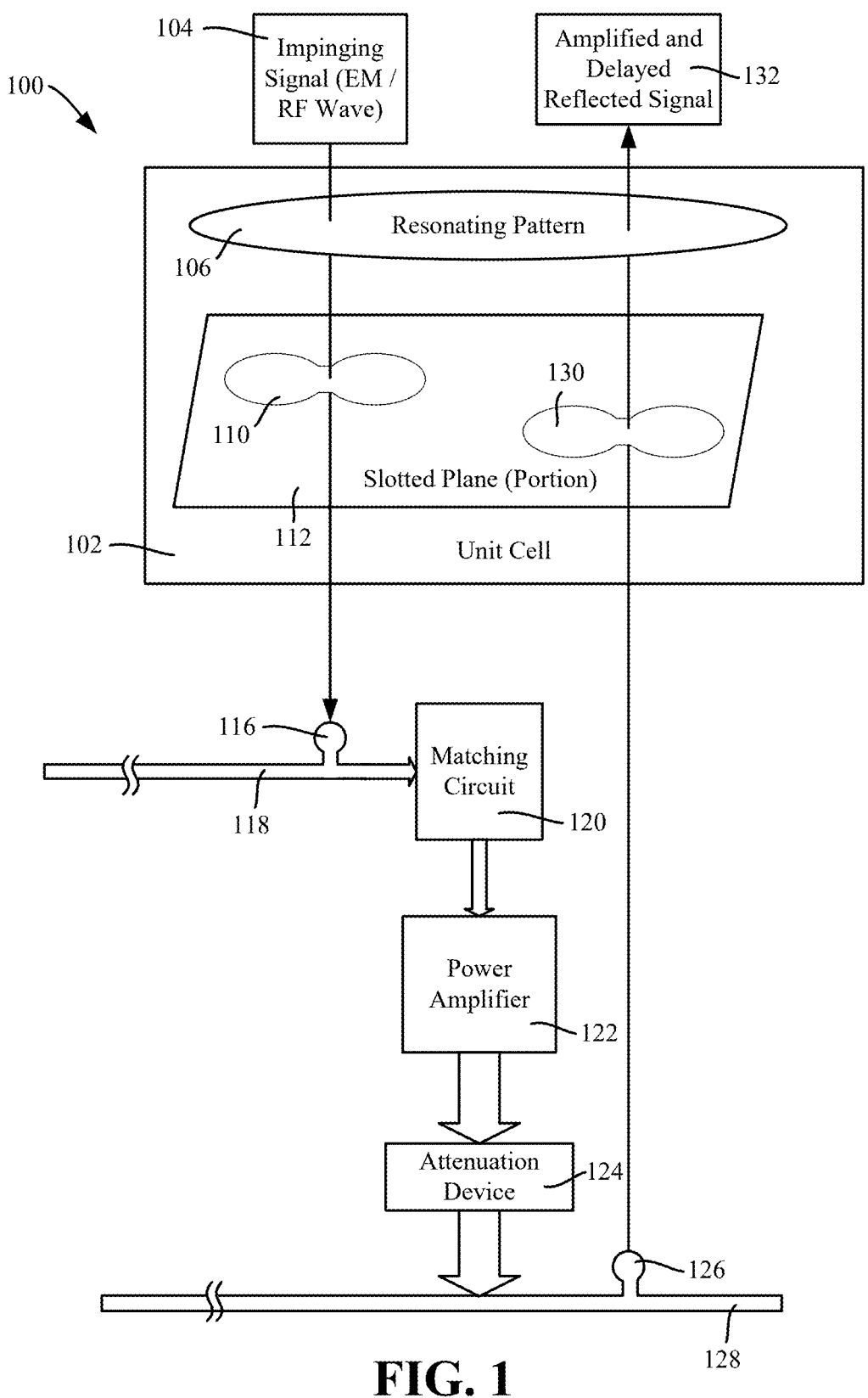
FIG. 1 is an example conceptual block diagram showing a system including a unit cell of a reconfigurable intelligent surface for reflecting an incoming signal as a selectively amplified and/or selectively attenuated instance of the incoming signal, in accordance with various example embodiments and implementations of the subject disclosure.

The technology described herein is generally directed towards integrating power amplifiers and selectable attenuation circuitry with reconfigurable intelligent surfaces. In one example implementation, power amplifiers and a switch-based attenuation device are surface mounted onto components (reconfigurable intelligent surface elements) of a reconfigurable intelligent surface, e.g., during the fabrication process. The inclusion of a power amplifier and digitally controlled attenuation device enable the RIS to actively amplify the signal when necessary and reduce the amplification strength when the signal strength is below the bias control threshold. This selective amplification and attenuation process offers an efficient and adaptable solution.

In one implementation, the technology described herein integrates a power amplifier and tunable attenuation device to an m×n subarray of unit cells (e.g., 3×3). During manufacturing, these components can be surface mounted onto the subarrays, providing signal amplification. This hardware-based approach receives the incoming signal, couples the signal for processing, estimates the angle of arrival (AoA) of the signal, boosts the signal, and transmits the signal with a controlled amount of desired attenuation. In one approach, the estimation of the AoA and the coupling of the signal for processing does not require any power, whereby this part is thus passive; only the signal boosters and tunable attenuator device consume a relatively small amount of power. It will be understood that the amount of power consumed is at the subarray level, rather than at each unit cell-level. The subarray concept, results in a reduction (e.g., ninefold for a 3×3 subarray), which in conjunction with the selective amplifier and attenuator usage can lead to lower costs, reduced power consumption, reduced heat dissipation, lesser signal distortion, and/or more manageable interference.

For example, because power amplifiers can consume significant power, the technology described herein facilitates balancing the amplification needs with power efficiency to ensure the system does not consume excessive energy, including in large-scale deployments. More particularly, to avoid the high cost and power demands of outfitting each reconfigurable intelligent surface element with a power amplifier, a more efficient approach is adopted by integrating a power amplifier and digitally tunable attenuator device with every m×n (e.g., 3×3) subarray (subgroup) of elements (unit cells). Proper impedance matching between the power amplifiers and the reconfigurable intelligent surface elements is maintained by using a matching circuit to minimize signal reflection.

In one or more example implementations, reconfigurable intelligent surface elements (unit cells) with concentric ring-shaped metallic patterns can be used; notwithstanding, any arbitrary shape can be used, provided that the elements resonate at the desired wireless communication frequency. Further, in one or more example implementations, to get a wide bandwidth response, two hourglass-shaped slots are used to passively couple the RF energy from the incoming signal (receive slots) and then transmit the outgoing amplified and/or attenuated signal via coupled RF energy through the transmitting slots; notwithstanding, any arbitrary slot shape can be used, as long as it corresponds to the resonating frequency.

The technology described herein estimates the angle of arrival of an incoming signal with a low-cost planar manufacturing approach utilizing static couplers beneath each unit-cell. This facilitates receiving an electromagnetic signal and reflecting a processed instance of the wireless signal, which can be without changing the signal polarization. The hardware design approach significantly reduces the hardware costs, interference, power consumption and heat dissipation in metasurfaces.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a unit cell 102 that redirects (reflects or refracts) an impinging (incoming) signal 104, (an electromagnetic (EM)/radio frequency (RF) wave, such as near or within the millimeter wavelength, e.g., above 25 gigahertz). A metallic resonating pattern 106 (e.g., a concentric ring-shaped metallic pattern) resonates at a frequency that corresponds to the frequency of the incoming signal. As set forth herein, a unit cell 102 can have a resonating pattern 106 of any suitable shape (e.g., square, rectangular and so on) that resonates at a corresponding frequency of the incoming signal, and is thus not limited to concentric ring patterns, nor limited to millimeter wave frequencies.

A first opening 110 (e.g., an hourglass-shaped opening) in a slotted plane 112 beneath and electrically insulated from the metallic resonating pattern 106 passes (e.g., couple/transfers) the signal 106 to a contact/terminal 116 of a first microstrip line 118 that is beneath and electrically insulated from the slotted plane 112. The slotted plane, which blocks the incoming RF signal (except via the opening 110) can be divided into electrically separated portions, e.g., one per unit cell, to help mitigate potential interference with respect to other unit cells. As set forth herein, a unit cell 102 can have an opening 110 of any suitable shape and size that passes the corresponding frequency of the incoming signal 104, and is thus not limited to hourglass-shaped openings.

The first microstrip line 118, which acts as a combining circuit, is coupled via an impedance matching circuit 120 to a power amplifier 122 such that the incoming signal passed to the terminal 118 can be controllably amplified, and controllably attenuated as described herein. The output of the amplifier is coupled to a tunable attenuator device 124 that selectively attenuates the selectively amplified signal. Note that the selectively amplified and/or attenuated signal thus can be of the same polarization as the incoming signal, because the length of the microstrip lines and the like result in delay that mitigates interference between the incoming signal and the amplified signal to be output; added delay can be used if desired.

In this example, the tunable attenuator device 124 electrically couples the selectively amplified (and/or selectively attenuated) signal to a contact/terminal 126 of a second microstrip line 128, which acts as a dividing circuit. Via the contact/terminal 126, the selectively amplified and attenuated signal is passed (RF coupled) through a second opening 130 (e.g., an hourglass-shaped opening) in the slotted plane 112, by which the selectively amplified and/or attenuated signal reaches the resonating pattern 106, resulting in a selectively amplified and/or attenuated redirected (e.g., reflected) signal 132.

As will be understood, the matching circuit 120, power amplifier 122 and tunable attenuation device 124 are shared, via the first microstrip line 118 and the second microstrip line 128, with one or more other unit cells. A switch-based attenuation device 124 is also shared as described herein. This reduces the high energy cost associated with each power amplifier. For example, a 3×3 subarray (subgroup) of unit cells based on the shared power amplifier design described herein results in only one amplifier for each subarray of nine unit cells, or one-ninth of the energy consumed by having a power amplifier per unit cell. As can be readily appreciated, instead of the 3×3 subarray used in the examples herein, other subarrays can be used, e.g., 2×2, 4×4, 5×5 and so on, depending on the tradeoff between power usage and the strength of the amplified reflected signal. Moreover, a non-symmetrical subgroup/subarray can be used, e.g., 3×4, 3×5 and so on; however symmetrical subgroups having the same number of unit cells in each dimension (m=n) helps facilitate modular design, as does having a reconfigurable intelligent surface made of same-sized subarrays, which also keeps design computations straightforward. The gain can be increased by less elements per amplifier, while the reflected beam is narrowed by more elements per amplifier; the cost versus elements per module/amplifier is a tradeoff that can be matched to a particular scenario where a reconfigurable intelligent surface is desired.

Thus, a significant enhancement to reconfigurable intelligent surface technology is described herein by the integration of power amplifiers and tunable attenuation circuitry. During the fabrication process, the power amplifiers and attenuation device can be surface mounted onto reconfigurable intelligent surface. To avoid the high cost and power demands of outfitting each reconfigurable intelligent surface element (unit cell) with a power amplifier, described herein is integrating a power amplifier with every m×n cluster of elements. Proper impedance matching between the power amplifiers and the reconfigurable intelligent surface elements is maintained by using the matching circuit to minimize signal reflection. In order to get a wide bandwidth response, two hourglass shaped slots are used to couple the RF energy from the incoming signal and then transmit the amplified signal.

Figure 2:
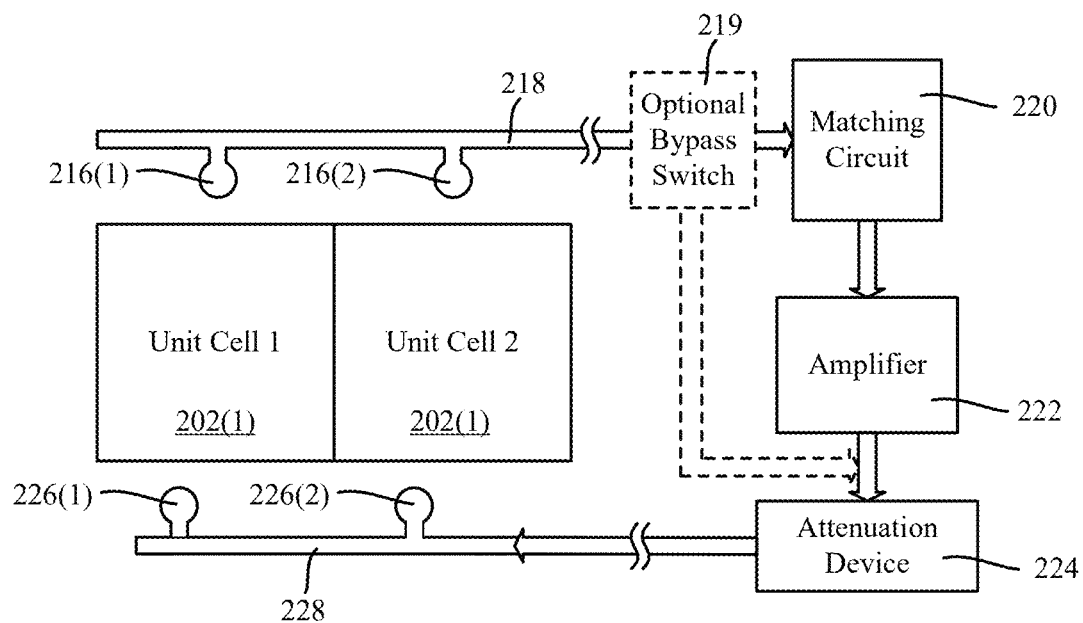
FIG. 2 is an example conceptual block diagram showing unit cells of a subarray of a reconfigurable intelligent surface that share circuitry for reflecting a selectively amplified and/or selectively attenuated incoming signal, in accordance with various example embodiments and implementations of the subject disclosure.

More particularly, FIG. 2 shows the concept of unit cells 202(1) and 202(2) sharing a matching circuit 220, power amplifier 222 and a tunable attenuator device 224. The first (incoming signal) microstrip line 218 has a contact/terminal 216(1) and 216(2) for the unit cells 202(1) and 202(2), respectively, to combine and couple the incoming signal to the shared matching circuit 220, power amplifier 222 and attenuation device 224. The amplified and/or attenuated output signal of the shared matching circuit 220, power amplifier 222 and tunable attenuator device 224 is electrically coupled to the second microstrip line 228 which has a contact/terminal 226(1) and 226(2) for the unit cells 202(1) and 202(2), respectively, to divide couple the amplified and/or attenuated signal to their respective metallic resonating patterns as generally described with reference to FIG. 1.

Further, FIG. 2 shows the concept of an optional bypass switch 219, which, for example, can be used to bypass amplification entirely. This can be useful when no amplification is needed, but the type of amplifier is one that does not pass the signal if turned off, or changes the signal strength too much when turned on to its lowest level. The tunable attenuator device 224 can also be bypassed, however this is generally not needed in one implementation, as one of the selected attenuator switch pairs of the tunable attenuator device 224 can be internally designed to operate as a bypass switch when selected, as described herein.

Figure 3:
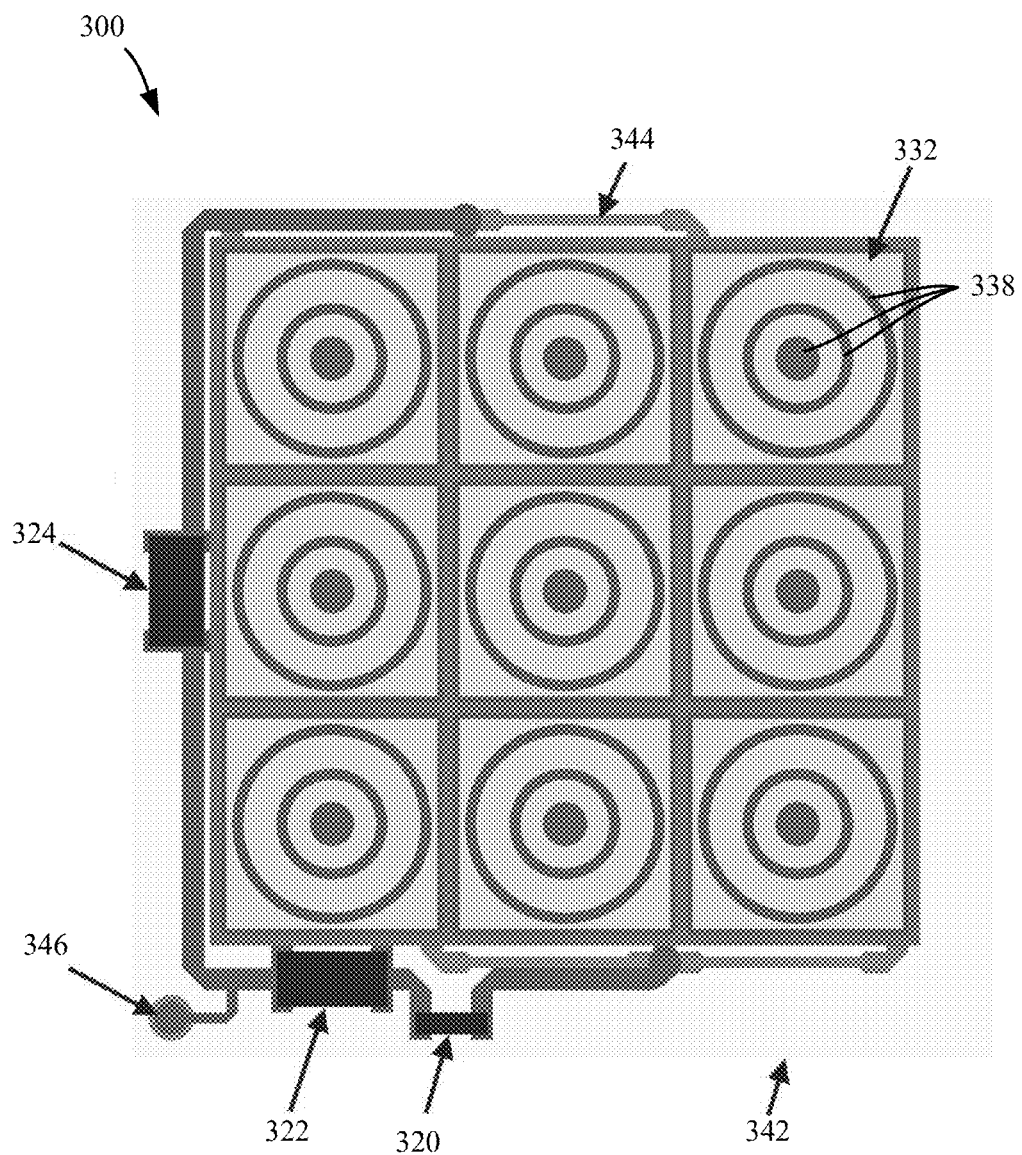
FIG. 3 is a top view representation of an example design of a subarray (subgroup) of unit cells that includes power amplifier circuitry and tunable attenuator circuitry on a dielectric substrate, in accordance with various example embodiments and implementations of the subject disclosure.
Figure 4:
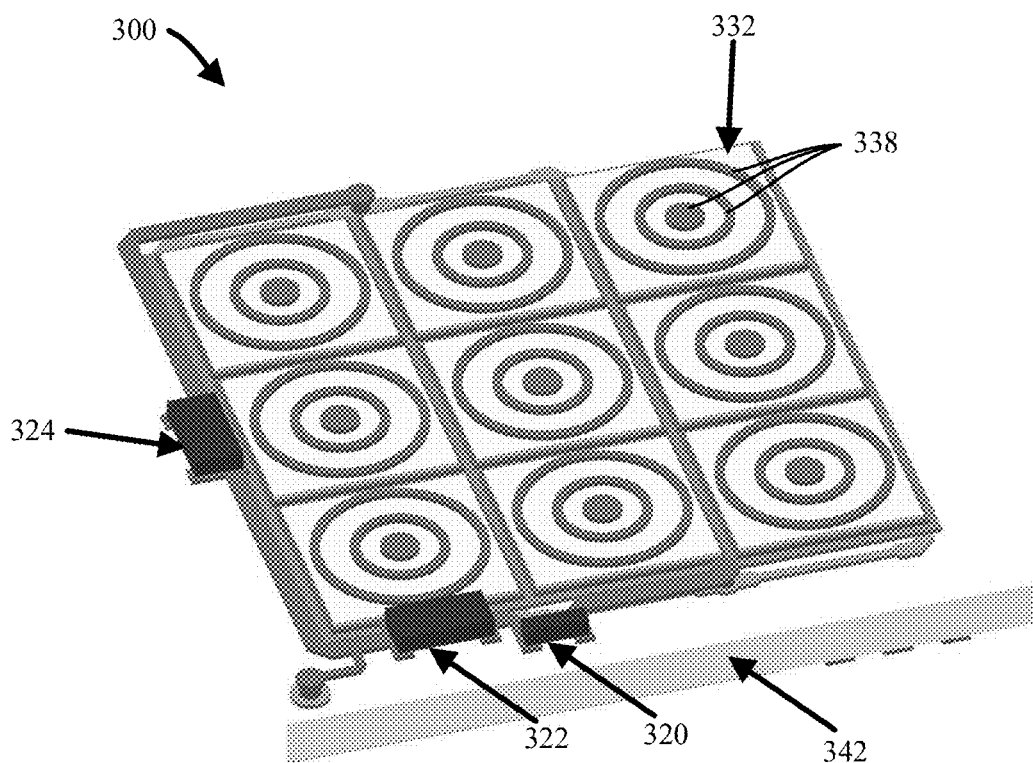
FIG. 4 is an isometric view representation of an example dynamic metasurface sub-array with nine unit-cells, a power amplifier, matching network, and a tunable attenuator device between the send/return path, in accordance with various example embodiments and implementations of the subject disclosure.
Figure 5:
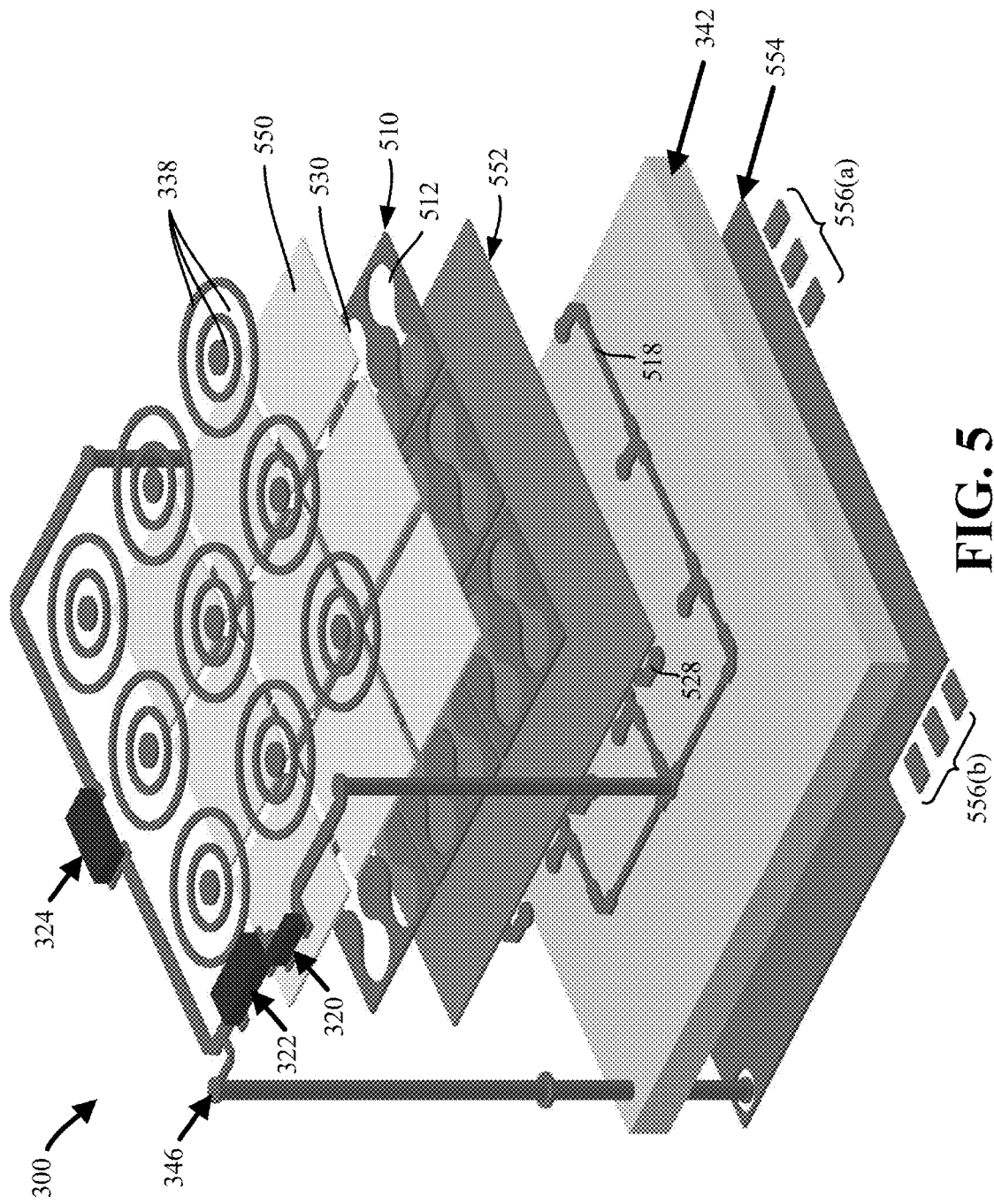
FIG. 5 is an exploded view representation of the example design of FIGS. 3 and 4 showing a stack of layers of the subarray, in accordance with various example embodiments and implementations of the subject disclosure.

FIGS. 3-5 show various two-dimensional and three-dimensional views of an example fabricated 3×3 subarray 300 of unit cells, including the resonating patterns of each unit cell. FIG. 3 shows a top-view representation of the subarray 300, FIG. 4 shows a three-dimensional perspective view of the subarray 300, and FIG. 5 shows an exploded view of the of the subarray 300.

In FIGS. 3-5, the resonating pattern 338 of metallic elements of concentric metallic rings of one unit cell 332 is labeled, with labels for the other resonating patterns of the other unit cells omitted for clarity. The unit-cells can be of any arbitrary shape as long as they resonate at the specified frequency of operation, e.g., 28 GHz in one example implementation. The unit cells rest on a dielectric substrate 342. The choice of substrate 342 can vary from a low-cost FR4 laminate, Rogers, alumina, quartz, or any other typically used substrate for multi-layer circuits. In one implementation used in simulations, the design used a low-cost FR4 substrate.

A matching network 320, a power amplifier 322, and a tunable attenuator device 324 are part of the subarray 300. Bias for the power amplifier can be provided via the terminal/contact 346 (over a via through the substrate); control signaling for the tunable attenuator device 324 can be provided below the switch through a via or the like (not explicitly shown). Each unit cell can include a variable capacitance device such as a varactor (FIG. 8) by which the phase of each unit cell can be controllably tuned; controlling the phases can result in constructive interference of the reflected signal from each unit cell, such as to change the combined signal's characteristics (e.g., reflected beam shape and direction). A microwave network 344 is formed by the microstrip lines and the matching network 320, power amplifier 322, and tunable attenuator device 324 circuitry as described with reference to FIGS. 1 and 2.

The exploded perspective view representation of FIG. 5 shows additional details of the example fabricated 3×3 subarray 300 of unit cells of FIGS. 3 and 4. The integrated design eliminates soldering multiple components for each unit-cell. Each power amplifier becomes the primary source of power usage, generates heat, increases the thermal noise floor, increase interferences, harmonic generation, requires a heatsink, and the like, which forfeits the purpose of low-cost metasurfaces concept in general. In the design described herein, the metasurface does not completely rely on the power amplifiers for amplification, but instead keeps the gain low enough, as it is used purely for boosting the processed signal, which already benefits from array gain.

In general, when signal is coupled through the (e.g., hourglass-shaped) couplers, in practice, the signal gets degraded, and a millimeter wave wireless signal moving through the layers and components can easily lose some amplitude. An integrated power amplifier helps recover the signal in conjunction with the typical array gain, without excessive heat generation and other interference/noise-related issues. However, the power amplifier may result in amplification that exceeds a desired amount, and cannot be lowered (unless turned off, even though some amplification is appropriate). As such, the attenuation device 324 can lower the amplification to the desired level.

As shown in FIG. 5, an upper dielectric layer 550 beneath the resonating pattern (e.g., 338) of each unit cell is shown as separated from the other dielectric layers of other unit cells; however a single shared dielectric layer may be used. A separate upper dielectric layer for each unit cell facilitates separate fabrication of each unit cell. Another dielectric layer 552 insulates the slot layer 510 from the microstrip lines 518 and 528. The upper dielectric layer or layers are generally transparent to the frequency of the incoming and outgoing signals.

An interlayer via routes the received signal from the first microstrip line 518 to the surface mounted power amplifier 322. Another interlayer via routes the amplified and attenuated signal from the second microstrip line 528 to the resonating patterns at the surface. Still other interlayer vias can be used for the DC power, e.g., to the varactors (FIG. 8), to the power amplifier bias terminal 346, and to the tunable attenuation device 324.

Beneath the substrate 342 is a bottom metallic layer 554; terminals 556(a) and 556(b) (as well as possibly others) can be used to couple the subarray 300 to other subarrays, and to the power amplifier bias control signal, the tunable attenuator device control signal, and to the varactors for bias control. A controller (FIG. 8) can be used to control the output signaling.

To summarize, the subarray dynamic metasurface shown in FIGS. 3-5 depict the internal layers and design concepts, in which the incoming signal, once received by the unit-cell arrays, is RF-coupled through the hourglass shaped couplers. The couplers are placed with a dielectric insulation layer, and are designed with maximum efficiency with a specified center frequency (e.g., of 28 GHz) similar to that of unit-cells. A design mismatch can cause issues with the signal going forward towards microwave circuit. It is also worth highlighting that the couplers need to be designed and a shape of the unit-cells need to be chosen such that the couplers should not act as a ground layer, but rather such that the openings, position, distance and the like of the coupler slots allows the signal to be almost completely absorbed or coupled with the bottom microwave circuit layer.

The coupled signal is picked up by the microwave circuit directly underneath the couplers' layer. The couplers and microwave circuitry are insulated by dielectric insulation. The microwave circuits has impedance matched T-shaped junctions to avoid any signal mismatch. The bottom metal layer under the substrate acts as a ground layer, and also has the (electrically insulated from ground) contact pads for connections, and to provide controlled bias to components such as power amplifiers and tunable attenuator devices. Interconnects are shown in FIG. 5 to highlight connections between the layers. This design allows reverse connection of the power amplifier and matching circuit to accommodate attenuation either before the power amplifier or after the power amplifier. This design only has four metal layers, thus reducing the manufacturing costs significantly.

Figure 6:
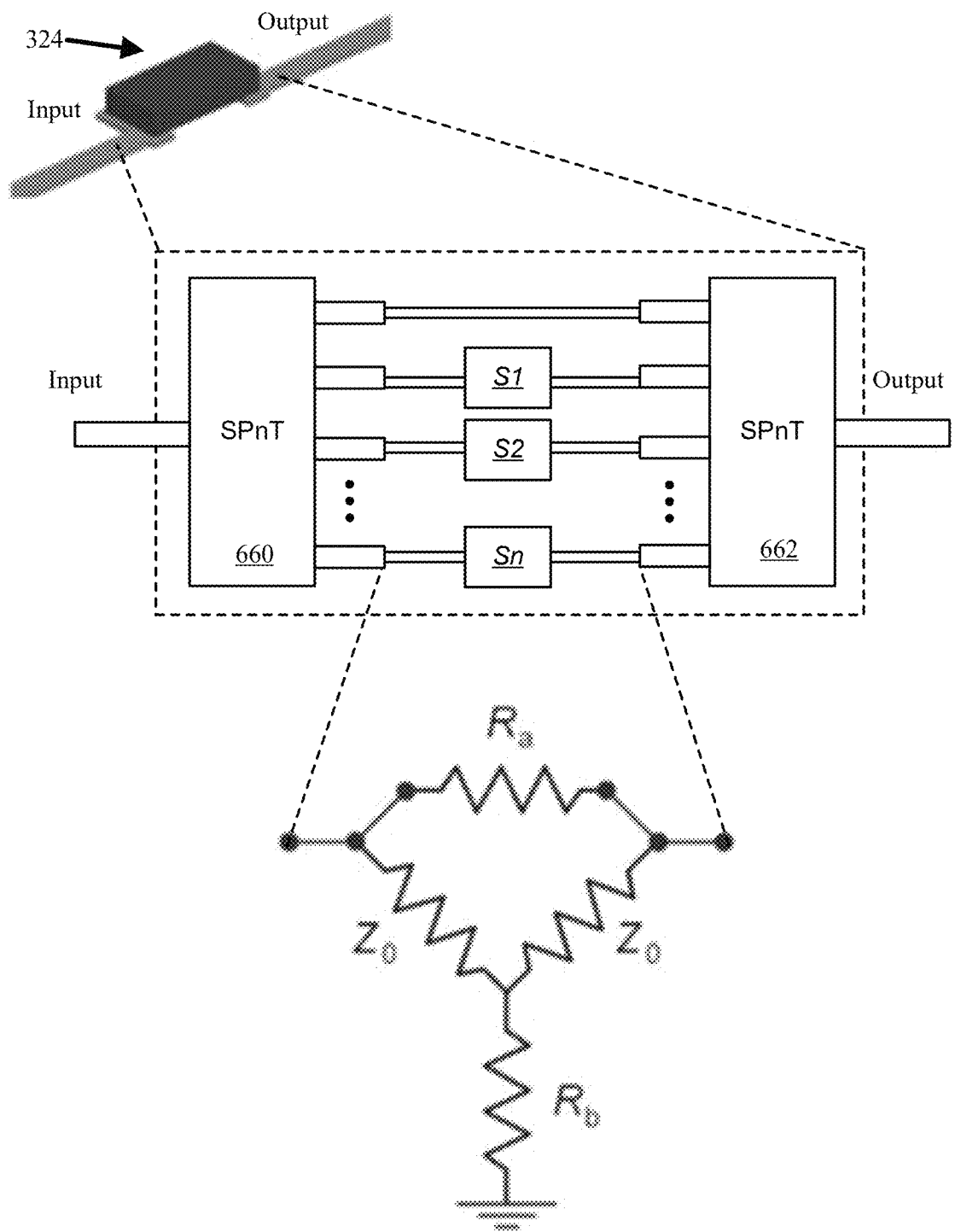
FIG. 6 is representation including an internal view of an example tunable attenuator device based on multi-port switches for selecting between different resistor networks, in accordance with various example embodiments and implementations of the subject disclosure.

Internals of one example tunable attenuator device 324 are shown in FIG. 6, in which two single-pole, n-throw (SPnT) switches 660 and 662 are connected back-to-back, with various resistor networks between transmission lines. For example, FIG. 6 shows that the reflected signal can be attenuated in n-steps, in a sequence such as S1, S2, S3, ... Sn as Stage 1 through Stage n. Stages can be designed based on the resistor values given in the below table and depending on the number of total n throws. Typically, SP8T switches can be used to accommodate seven (8-1) different levels of attenuations in the reflected signal; the remaining switch pair and resulting output is used for bypassing the attenuation. Note that the attenuator network need not rely on commercial tunable attenuator circuits, but rather this internal resistor approach can be used to custom design the level of attenuation and integrate these using multi-throw switches heterogeneously.

To achieve certain attenuation levels, the resistor network values can be computed using:

$$R_a = Z_0(A-1)$$

$$R_b = Z_0/(A-1)$$

where, A is the attenuation factor, and $Z_0$ is the impedance of the circuit (assuming source and load impedance is matched and equal). By way of example, to calculate the values of the resistors required in a 50Ω matched system to attenuate the signal by 3 dB:

$$A = 3 \text{ dB} = 10^{(3/20)} = 1.4125$$

$$Z_0 = 50$$

$$R_a = Z_0(A-1) = 50(1.4125-1) = 20.625\Omega$$

$$R_b = Z_0/(A-1) = 50/(1.4125-1) = 121.212\Omega$$

Resistor values for the passive resistor-based attenuator cell in 50Ω system.

| Attenuation (dB) | A (Attenuation Factor) | $R_a(\Omega)$ | $R_b(\Omega)$ |
|---|---|---|---|
| 2 | 1.2589 | 193.1 | 12.9 |
| 4 | 1.5849 | 85.5 | 29.2 |
| 6 | 1.9953 | 50.2 | 49.8 |
| 8 | 2.5119 | 33.1 | 75.6 |
| 10 | 3.1623 | 23.1 | 108.1 |
| 12 | 3.9811 | 16.8 | 149.1 |
| 16 | 6.3096 | 9.4 | 265.5 |
| 20 | 10.0000 | 5.6 | 450.0 |

The resistor network approach is fully passive and allows precisely attenuating the signals. Note that one possible disadvantage of this approach is to achieve precise resistor values at millimeter wave (mmWave) systems, because for an ultra-low attenuator or more than 20 dB attenuation, a large difference of resistor values is specified as per the above table for a 50Ω impedance, which sometimes may not be possible to implement, as resistors at higher frequencies start behaving like inductors and induce a roll-off in the attenuation over frequency.

In many scenarios, the incorporation of back-to-back connected SPnT switches bridged by various resistor networks can precisely attenuate the excessive gain signals passively. These switches offer refined control over the amplification process, being controllably activated, when needed, otherwise reflecting the signal as such in the desired direction. In most situations, a power amplifier bias has a minimum and maximum threshold to keep the power amplifier in linear regime and not in overdrive state. In underpowered, active devices will not bypass the signals, whereby a passive attenuator would further reduce the signal strength. The selective amplification described herein ensures efficient power usage and significantly boosts the RIS's overall effectiveness. By enabling the RIS to intelligently determine the need for signal enhancement, the SPnT based attenuation conserves energy, and also enhances the RIS's adaptability and performance in varying network conditions. This results in a more versatile, energy-efficient, and effective solution for enhancing signal quality across wireless networks To summarize, the switch toggles among n-states, either bypassing the signal through the power amplifier for amplification, or selecting among desired attenuation levels, routing the signal to the dividing circuit which then re-distributes it among the RIS elements for re-radiation in the desired direction. In case of amplification, the enhanced signal is equally distributed among the transmitting slots and re-emitted from the top metallic elements.

Turning to another concept, described herein is a hardware approach to estimate the angle of arrival of an incoming wireless signal illuminating (impinging on) the metasurface panel. This is included with the integrated solution of processing the signal, and operates without disrupting the reflected signal reflecting off the panel as also described herein, that is, by the integration of the hourglass shape static couplers beneath the unit-cells, followed by microwave processing circuitry to amplify the reflected signal and/or to add a tunable attenuation level before transmitting the processed signal, which can be in the same polarization as of the incoming signal.

To this end, when an incoming millimeter-wave (mm-Wave) wireless signal impinges on the panel, one step can be to estimate the angle of arrival (AoA) of the signal. Note that while the base station position is fixed and thus the AoA for signals transmitted therefrom is already predetermined, user equipment (UEs) are not fixed and often movable. Thus, to establish a return path, a signal from a mobile UE towards a base station with an in-between metasurface makes the AoA variable.

Figure 7:
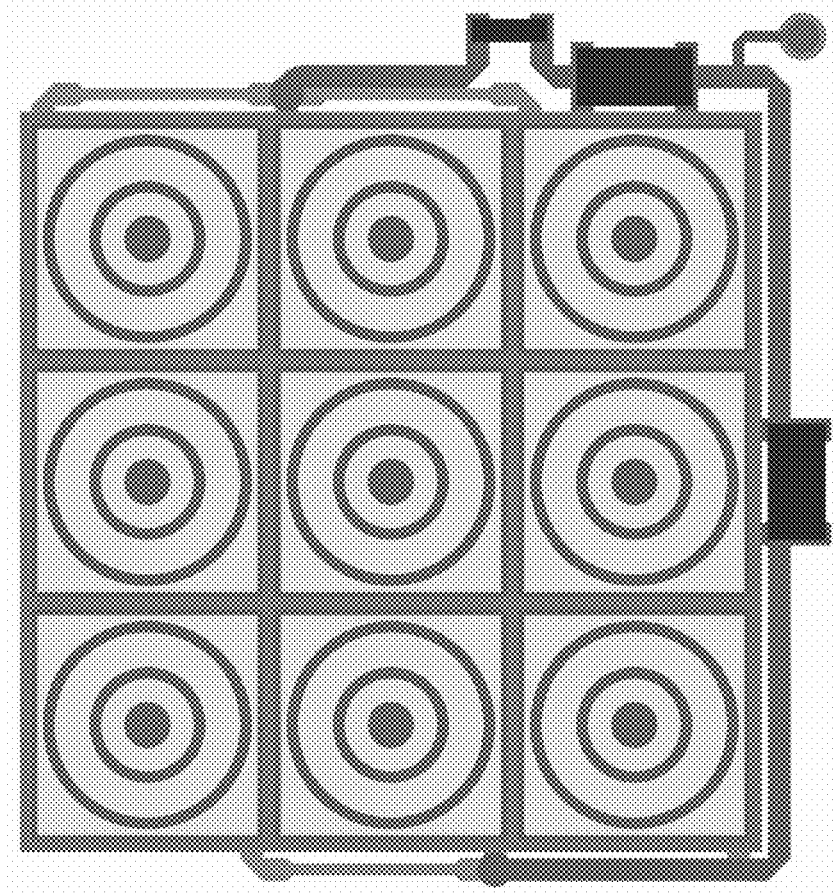
FIG. 7 is a top view representation of an example subarray of unit cells showing delay determination between consecutive unit cells to facilitate estimation of the angle of arrival of an incoming signal, in accordance with various example embodiments and implementations of the subject disclosure.
Figure 12:
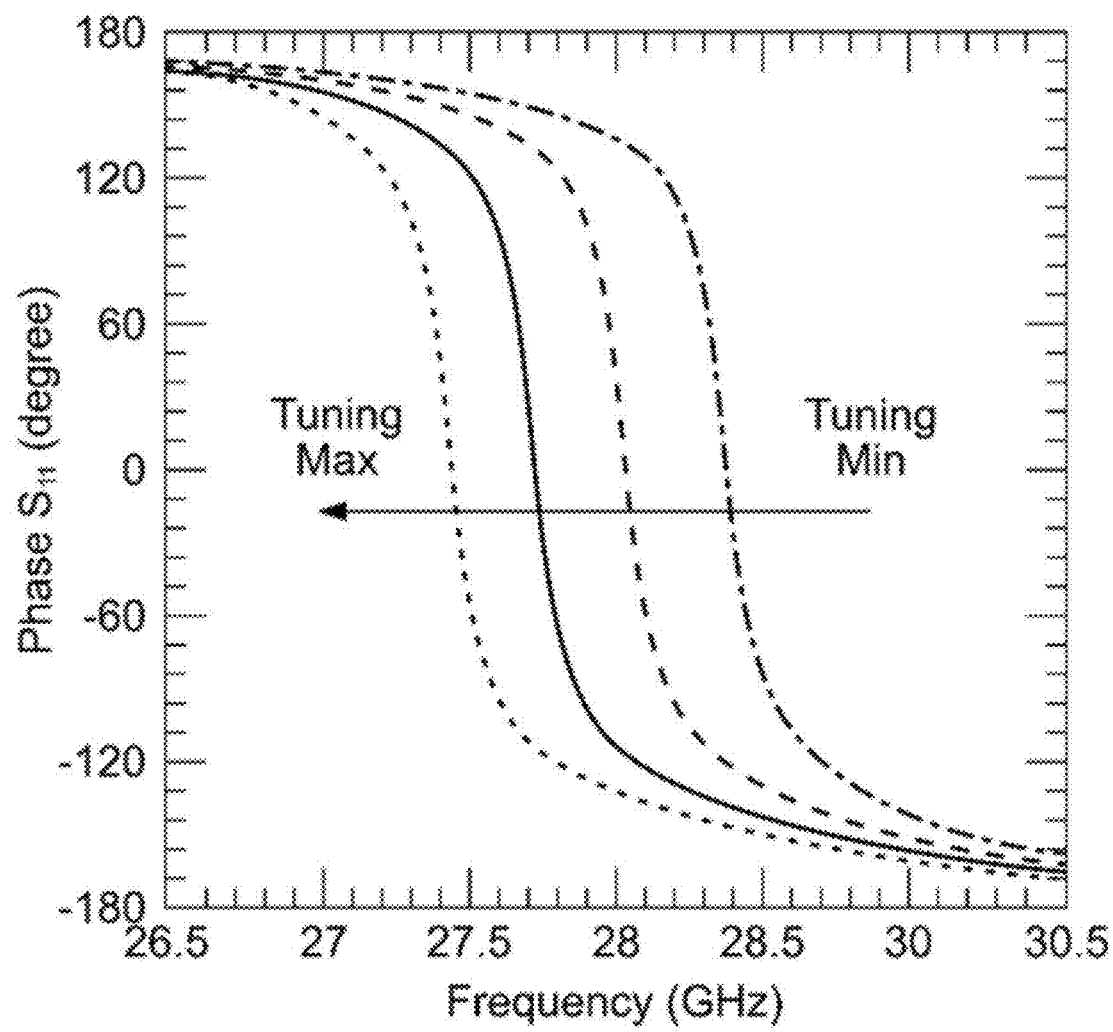
FIG. 12 is a graphical representation of phase of a reflected signal around the operational frequency of 28 GHz, as varied with the change in capacitance of varactors, in accordance with various example embodiments and implementations of the subject disclosure.

The AoA can be estimated by computing the delay between unit-cells, typically consecutive unit cells either in a row or a column. In general, the beam width is large enough to illuminate the whole panel, and a panel size can include hundreds of unit-cells or multiple subarrays. Delay can be estimated by studying the $S_{11}$ (reflection coefficient) of the incoming signal as described herein; note that S-parameters are commonly used in RF and microwave systems. A microwave processing circuit embedded in each sub-array allows precisely capturing the $S_{11}$. When estimating the delay between two consecutive cells, a time differential δd is added because the position of the unit-cells are at a certain known (defined during design) distance as shown in FIG. 7, typically in the sub-wavelength regime. These time differential data are associated with phase differential data, which for a row or column of unit cells generally align with one another based on the angle of arrival (FIG. 12).

Figure 8:
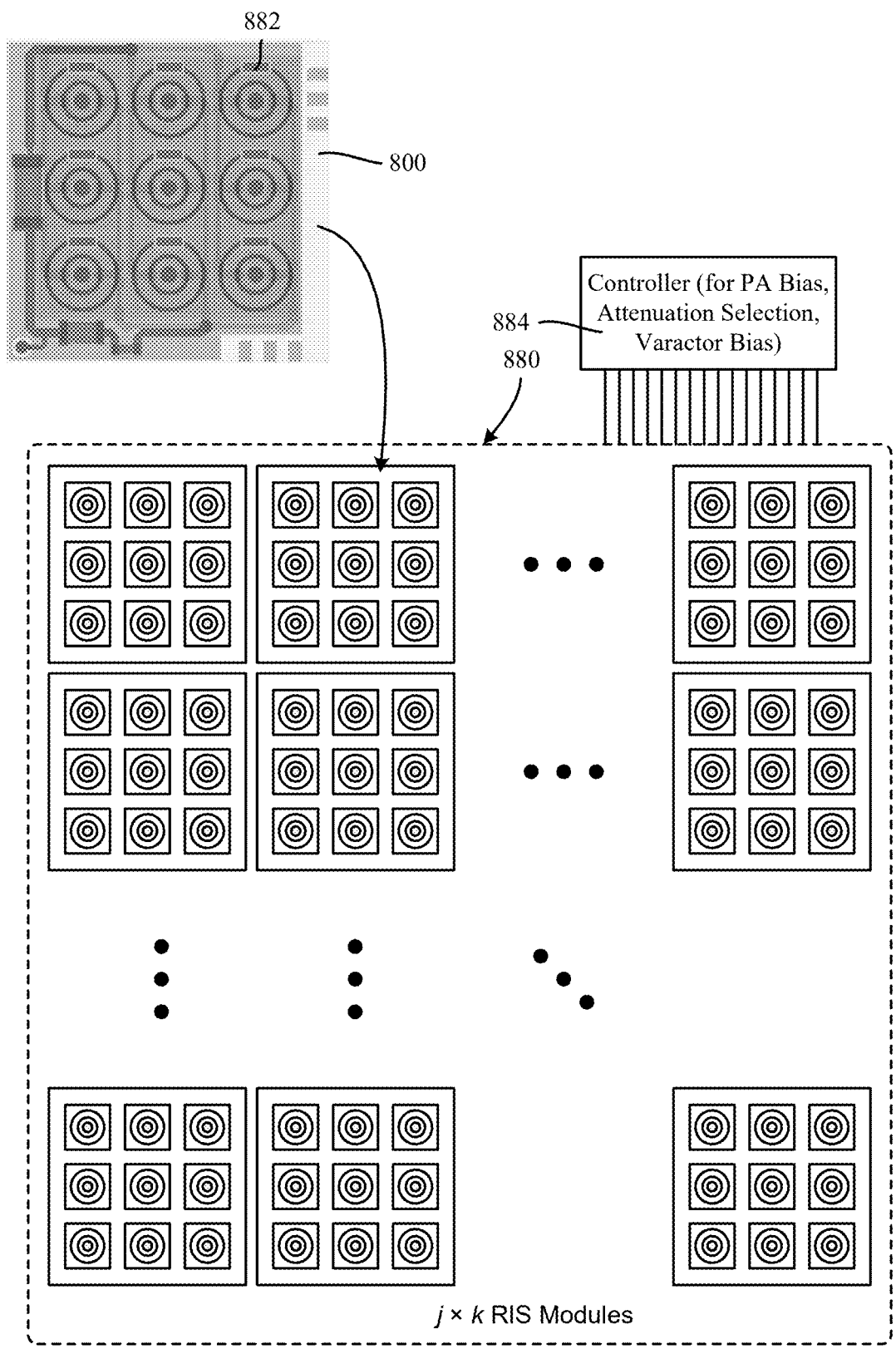
FIG. 8 is a top view representation showing how subarrays of unit cells can be combined into a reconfigurable intelligent surface, in accordance with various example embodiments and implementations of the subject disclosure.

FIG. 8 shows how a subarray 800 can be incorporated with other subarrays (j×k RIS modules) into a reconfigurable intelligent surface (RIS) 880. Note that the enlarged portion showing the subarray 880 also shows varactors (or other tuning devices) integrated with each unit cell, e.g., as small rectangles in FIG. 8. One such varactor 882 is labeled in FIG. 8, with the other varactors not labeled for purposes of clarity.

A controller 884 is coupled to the reconfigurable intelligent surface 880, which outputs control signals for power amplifier (PA) bias, attenuation selection, and varactor bias to the components of the subarrays. The controller 884 can act on feedback from the base station and/or UEs, such as to determine whether to boost the signal, whether to change the attenuation, and/or how to reshape and/or change the direction of the reflected signal. The controller 884 also can determine the angle of arrival of the incoming signal.

Figure 9:
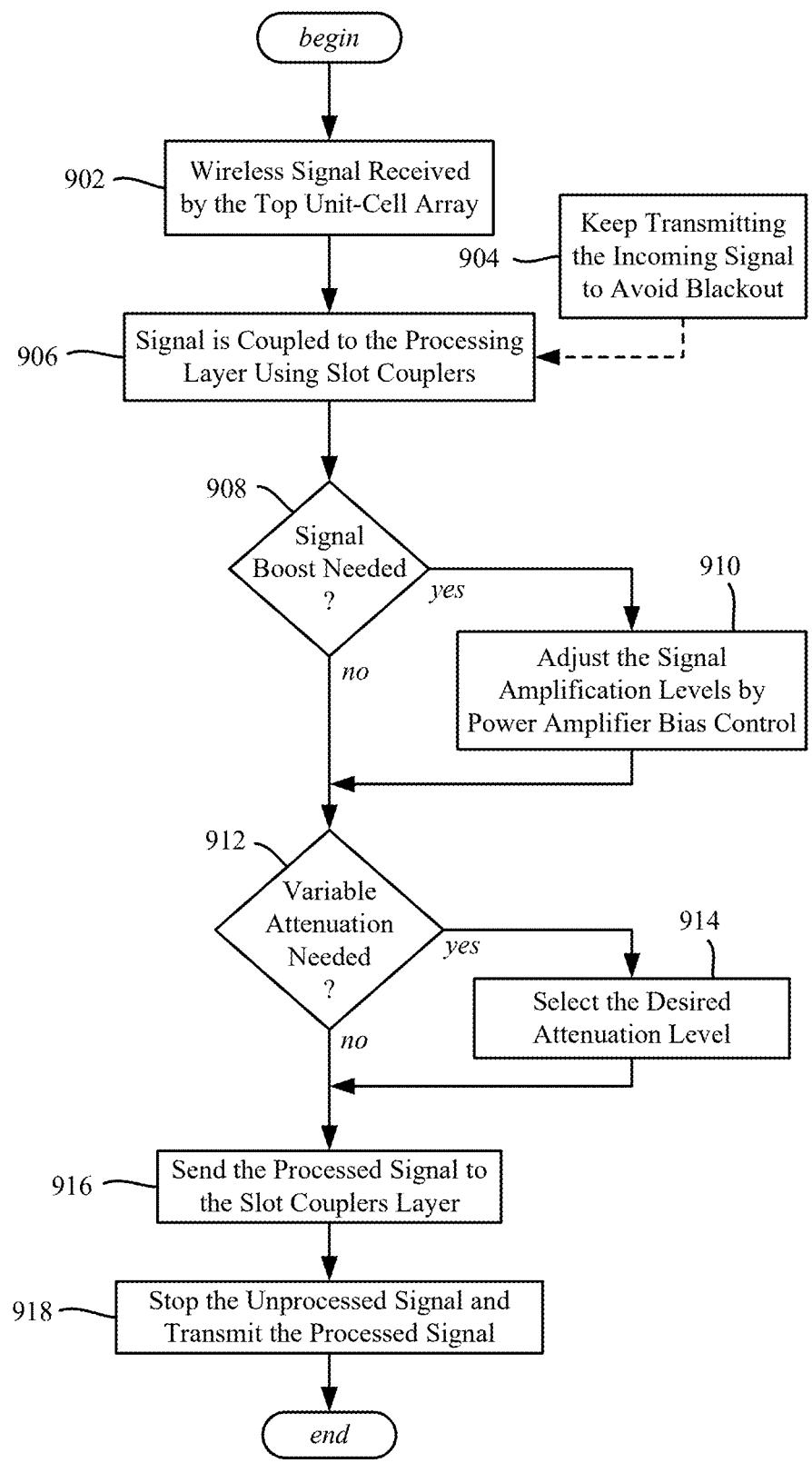
FIG. 9 is a flow diagram showing example operations related to selectively controlling signal power amplification and/or selectively controlling signal attenuation with respect to a reflected instance of an incoming signal, in accordance with various example embodiments and implementations of the subject disclosure.

The flow diagram of FIG. 9 explains the working principle and selection criteria of various integrated components in one implementation, including whether amplification is needed or controlled purely by bias control, or after attenuation, signal reduction needs to be adjusted by variable attenuator. Operation 902 which represents the incoming signal being received by the metasurface. Note that the signal continues being transmitted (operation 904) to avoid blackout. As described herein, the signal is RF-coupled to the processing layer via the slot couplers as represented by operation 906.

If signal boost is needed, (e.g., as similar specified by feedback or control information to the controller) as evaluated at operation 908, operation 910 adjusts the signal amplification level by bias control as specified. If variable attenuation is needed (e.g., as specified by feedback or control information to the controller) as evaluated at operation 912, operation 914 adjusts the variable attenuation level by switch control as specified; if no additional attenuation is needed, the switches remain in the state corresponding to the most direct path (e.g., the no additional resistance line in FIG. 6, although a separate bypass switch as in FIG. 2 is feasible).

Operation 916 represents sending the processed signal to the slot couplers layer, that is, for RF coupling back to the resonating patterns. At this point, as represented by operation 918, the unprocessed signal is stopped, and the processed signal is transmitted (e.g., reflected) by the metasurface.

The design and evaluation of one implementation of the subarray design for a reconfigurable intelligent surface panel have been performed through comprehensive full wave simulations using 3D electromagnetic (EM) simulation software (e.g., Ansys HFSS). The thickness, dielectric constant, and other characteristics of the dielectric layers are chosen such that the impedance of 50 Ohm is maintained. The results are shown in the graphical representations of FIGS. 10 and 11.

Figure 10:
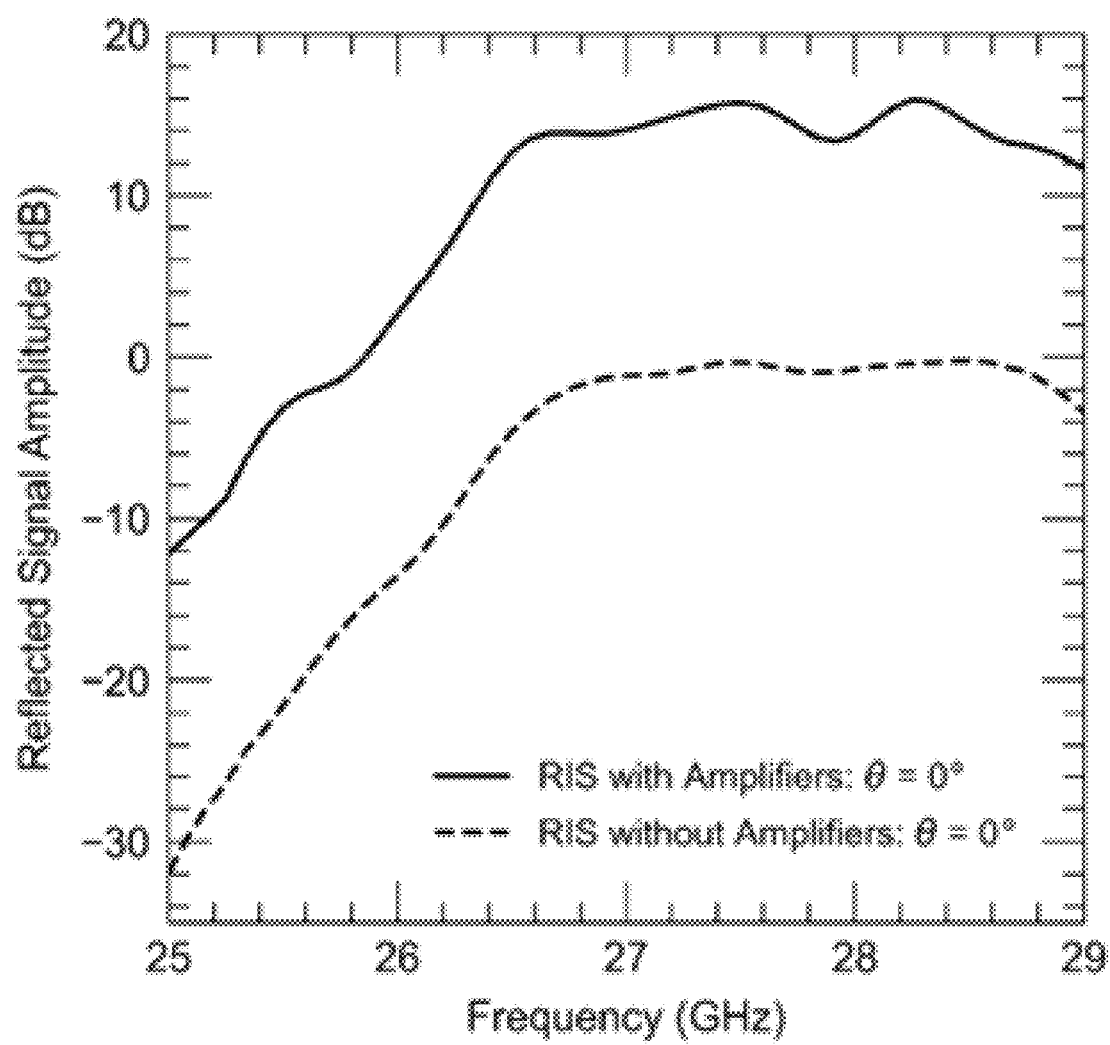
FIG. 10 is a graphical representation of signal amplitude of a reflected signal around the operational frequency of 28 GHz, with and without amplification, in accordance with various example embodiments and implementations of the subject disclosure.

When the incident signal is normal to the surface of the evaluated reconfigurable intelligent surface, which means that the angle of arrival (AoA), θ is 0°, FIG. 10 shows the significant difference in reflected signal amplitude for the RIS with and without amplifiers. The passive gain of the evaluated reconfigurable intelligent surface lies between −2 dB and 0 dB from 26.5 GHz to 29 GHz, while the active gain is between 12 dB to 16 dB for the same frequency range.

Figure 11:
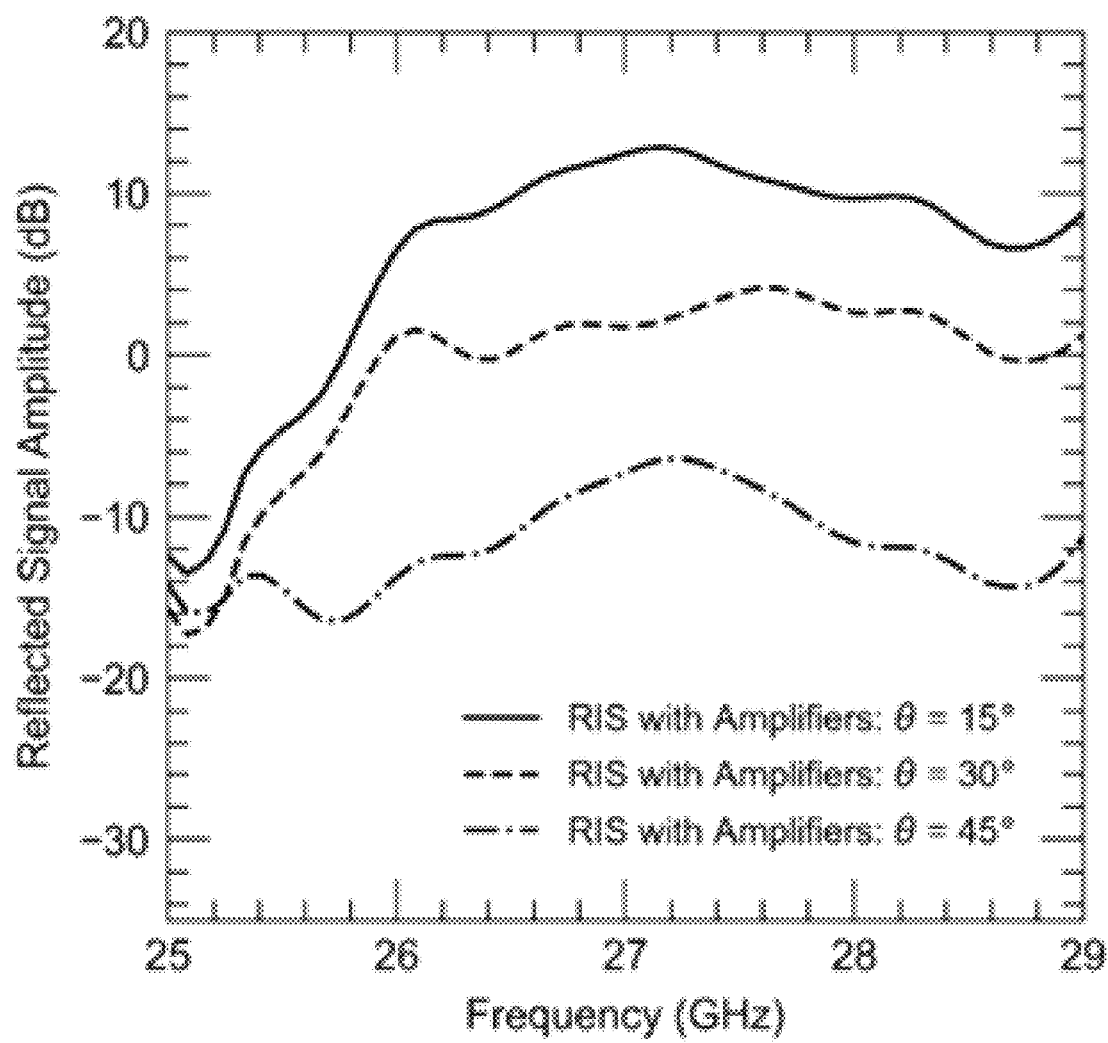
FIG. 11 is a graphical representation of the magnitude of the reflected signal for different angles of arrival of the incoming signal, in accordance with various example embodiments and implementations of the subject disclosure.

FIG. 11 shows the active gain from RIS for the incoming signal AoAs (θ) of 15°, 30°, and 45°. More specifically, for the incident angle of 15°, the reflected signal amplitude is 9.5±3 dB for the frequency band 26 GHz to 29 GHz. When the incoming signal hits the surface at 30°, the amplified reflected signal amplitude is 2±2.1 dB. For the incident angle of 45°, the reflected signal amplitude is 10±4 dB for the frequency range 26 GHz to 29 GHz.

Figure 13:
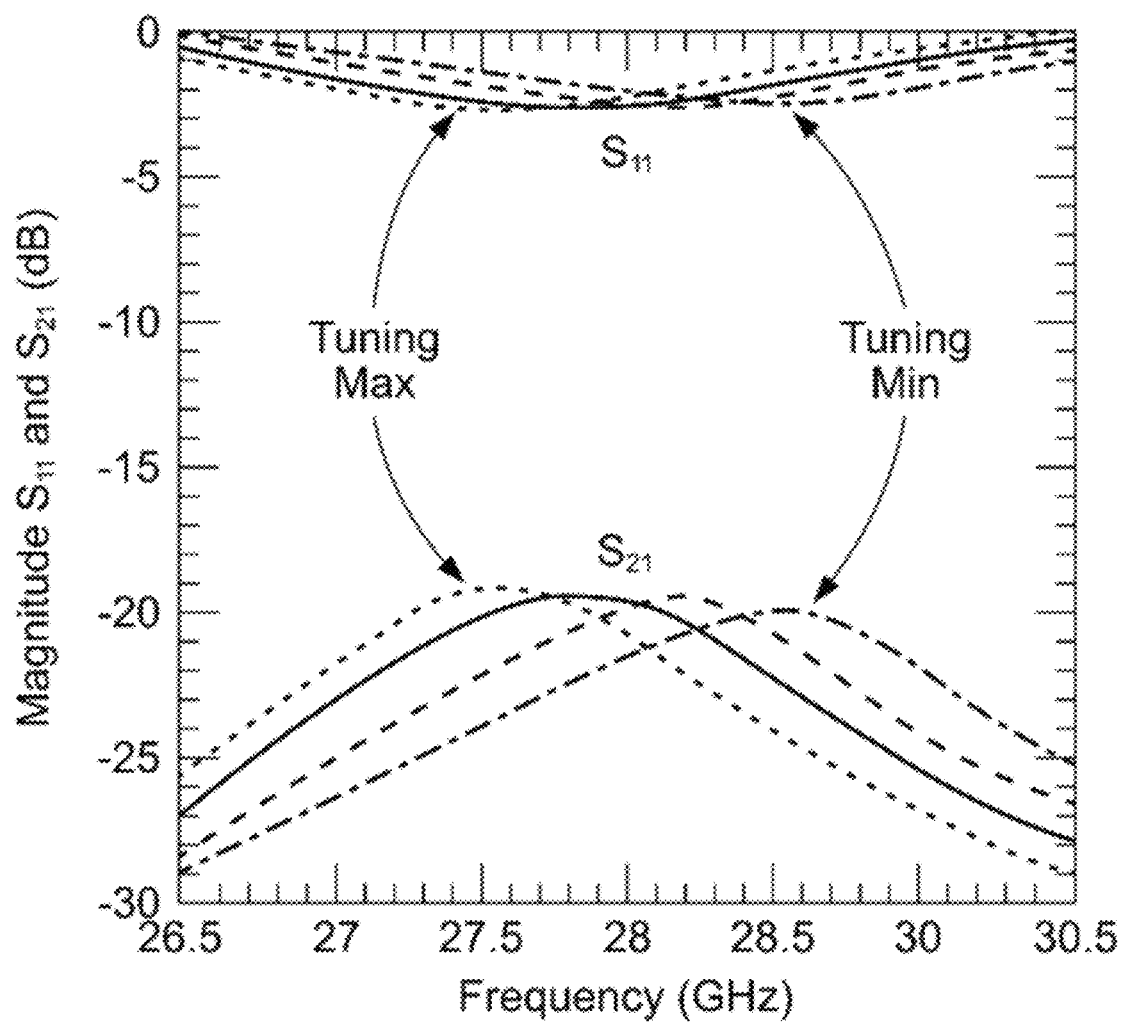
FIG. 13 is a graphical representation of the magnitude of the reflected signal for different varactor capacitances, in accordance with various example embodiments and implementations of the subject disclosure.

FIGS. 12 and 13 show the full-field 3D electromagnetic (EM) response highlighting operating region between 27.5 to 28.5 GHz. The simulation results shown in FIGS. 12 and 13 validate the operation of metasurface module by showing minimum and maximum tuning range (e.g., when varactor-based tuning is provided), with 28 GHz center frequency and 1 GHz of operational bandwidth. The magnitude of the signal reflecting from the unit-cells, and coupled energy at the bottom of the cells is shown in FIGS. 12 and 13 as well. As can be seen, there is at least 15 dB difference in the reflecting signal and transmitting signal to avoid any interference. The simulations were carried out using an industry standard full-wave 3D finite element modeler used for EM designs.

Figure 14:
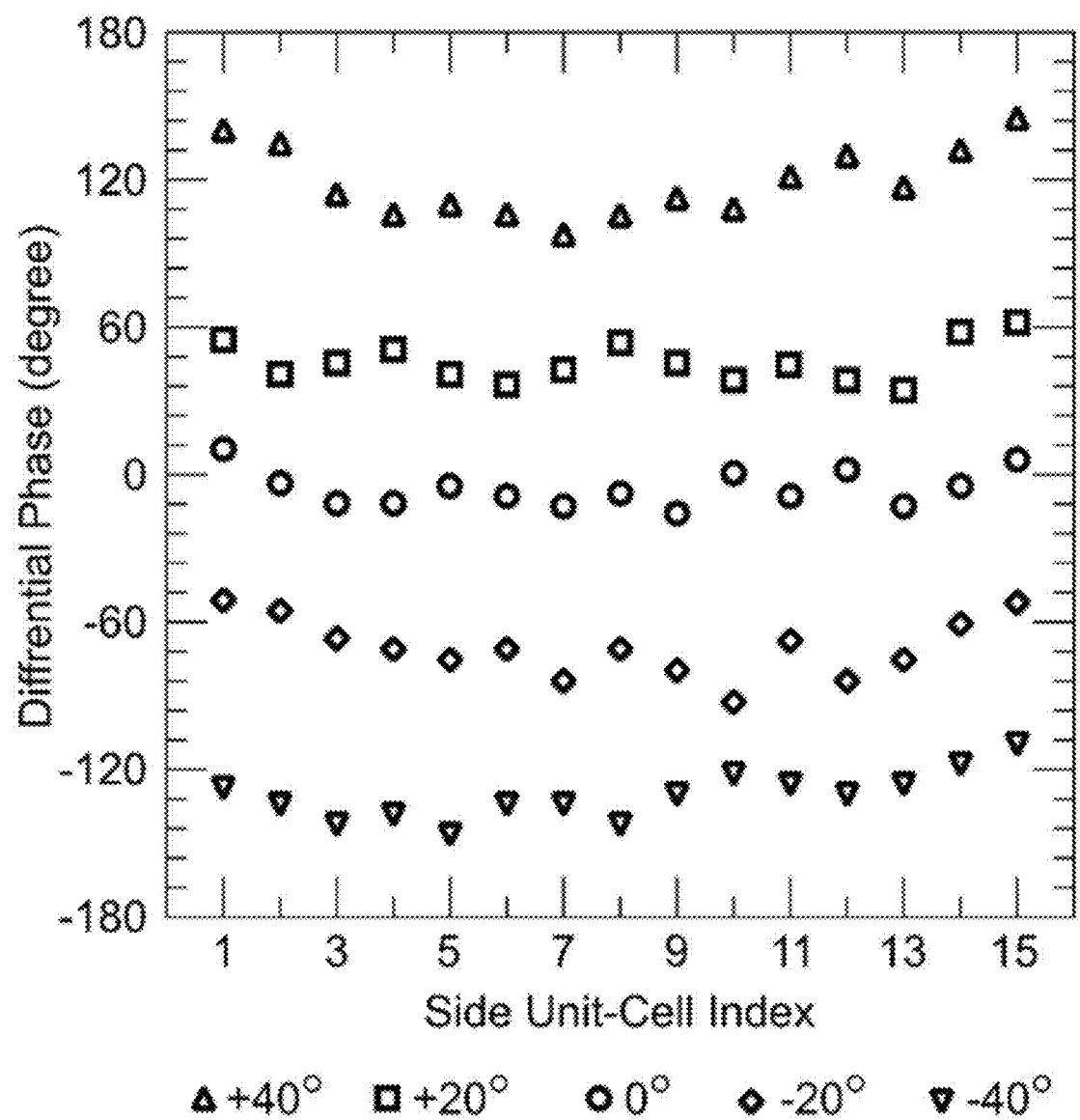
FIG. 14 is a graphical representation showing an example of differential phase values experienced by unit cells elements along a 16×1 array of elements of a reconfigurable intelligent surface for incoming signals with different angles of arrival, in accordance with various example embodiments and implementations of the subject disclosure.
Figure 15:
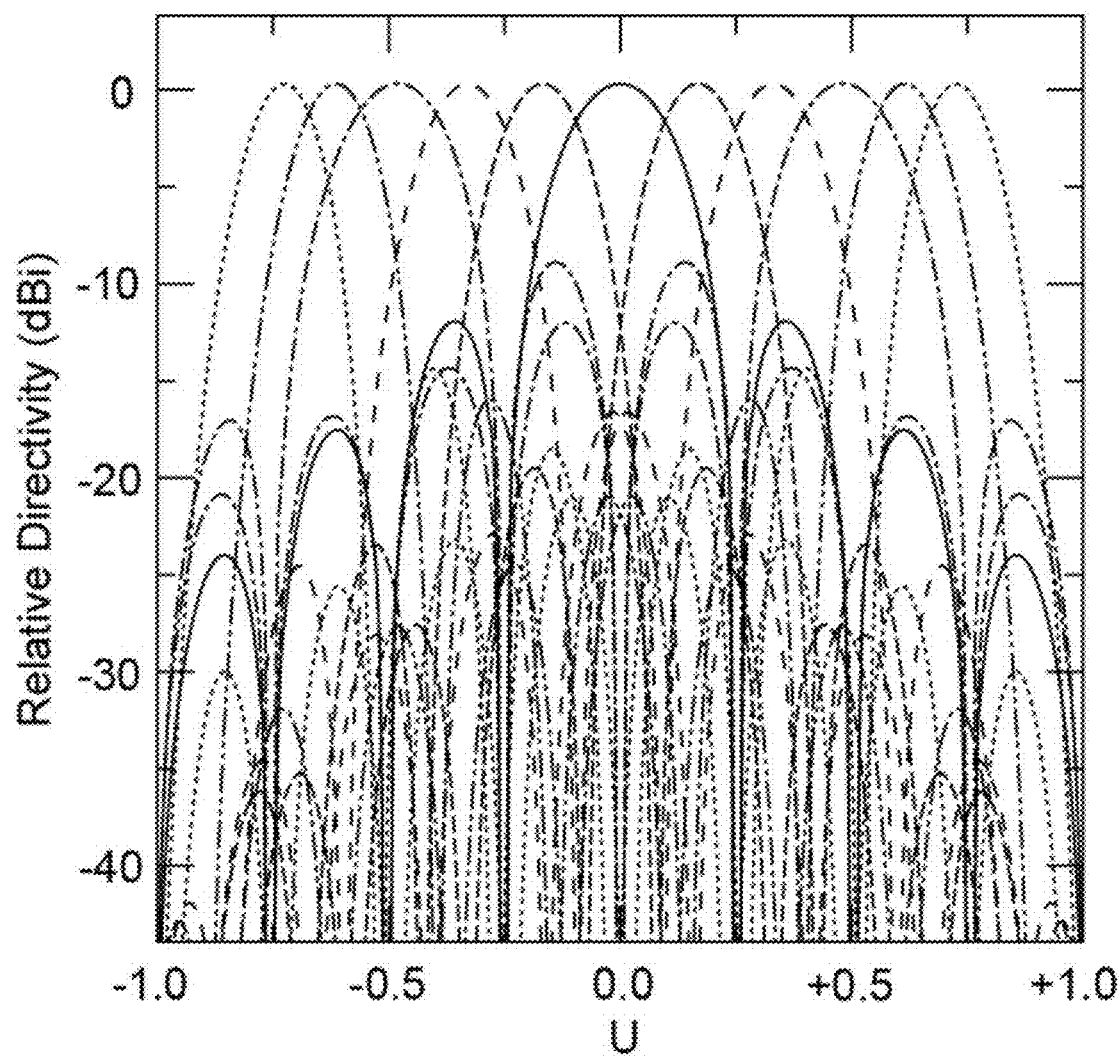
FIG. 15 is an example diagram showing the relative directivity corresponding to a reconfigurable intelligent surface configuration (with 64 unit cells), in accordance with various embodiments and implementations of the subject disclosure.

FIGS. 14 and 15 also show the full-field 3D EM response with respect to how differential phase (in degrees) can be used to estimate the angle of arrival (AoA) as shown in FIG. 14. More particularly, the response of AoA estimation using differential delay is shown in FIG. 14 for different incoming signals illuminating the panel from +40° to −40° in 20° step-size increments. It is seen that it the differential delay response between pairs of consecutive cells (e.g., the 15 indexes represents the differences between the time delay at sixteen pairs of adjacent cells) tend to align along the same differential phase value, which corresponds to the estimated angle of arrival. Note that this is not a perfectly precise analog method, but works well at reasonably quantized levels, such as every 20° or 15° step size in angles of arrival. This can be further tweaked by placing the unit-cells at closer proximity by reducing the wavelength.

When tuning is provided, the reflected beam or angle of departure (AoD) can be steered in a direction of choice, as shown in the simulation response of relative directivity (dBi) in FIG. 15 for a 64 cell metasurface. The relative response is chosen for the graph because of the large number of datasets, and to highlight the clear steering patterns.

One or more example embodiments can be embodied in a system, such as described and represented herein. The system can include a subgroup of a group of unit cells of a reconfigurable intelligent surface, in which the subgroup is electrically coupled to a power amplifier and variable attenuator device shared by the subgroup. The subgroup can be configured to receive an electromagnetic signal to obtain a received electromagnetic signal, couple the received electromagnetic signal to a first microstrip line, electrically coupled to the power amplifier, to input the received electromagnetic signal to the power amplifier, selectively amplify the received electromagnetic signal to output a selectively amplified electromagnetic signal to the variable attenuator device, and selectively attenuate the selectively amplified electromagnetic signal to output a selectively amplified and selectively attenuated signal to a second microstrip line electrically coupled to the variable attenuator device. The subgroup further can be configured to couple the selectively amplified and selectively attenuated electromagnetic signal from the second microstrip line to respective resonating metallic portions of respective unit cells of the subgroup, to combine and redirect the selectively amplified and selectively attenuated electromagnetic signal from the subgroup.

The variable attenuator device can include controllable switches that select among different resistor networks based on a control signal.

The group of unit cells can be separated from one another by defined distances that facilitate determination of an angle of arrival of the received electromagnetic signal based on time differential data that can be associated with differential phase data corresponding to the angle of arrival.

The respective unit cells of the subgroup can couple the received electromagnetic signal to the first microstrip line via first respective openings of a slotted plane layer, and the respective unit cells of the subgroup can couple the selectively amplified and selectively attenuated electromagnetic signal to the respective resonating metallic portions via second respective openings of the slotted plane layer. The first respective openings and the second respective openings can be hourglass shaped. The first respective openings and second respective openings can be sized to correspond to a resonating frequency of the respective resonating metallic portions.

The power amplifier can be selectively controlled to adjust a signal amplification level applied via a power amplifier bias control.

The system can further include an impedance matching circuit coupled to the power amplifier.

The subgroup can include a two-dimensional array of the respective unit cells. The two-dimensional array can include: four unit cells arranged as two unit cells by two unit cells, nine unit cells arranged as three unit cells by three unit cells, sixteen unit cells arranged as four unit cells by four unit cells, or twenty-five unit cells arranged as five unit cells by five unit cells. The two-dimensional array can include a first number of unit cells in a first dimension that does not equal a second number of unit cells in a second dimension.

One or more example embodiments can be embodied in a unit cell, such as described and represented herein. The unit cell can include a resonating metallic portion, and a slotted plane comprising a first opening configured to pass an impinging electromagnetic wave to a first microstrip line coupled to the unit cell. The unit cell can be coupled to a power amplifier that amplifies the impinging electromagnetic wave into an amplified electromagnetic wave, and a variable attenuator device that attenuates the amplified electromagnetic wave to output an attenuated instance of the amplified electromagnetic wave to a second microstrip line coupled to the unit cell. The slotted plane further can include a second opening configured to pass the attenuated instance of the amplified electromagnetic wave from the second microstrip line to the resonating metallic portion to redirect the attenuated instance of the amplified electromagnetic wave as a reflected attenuated instance of the amplified electromagnetic wave.

The unit cell can be a first unit cell, the reflected attenuated instance of the amplified electromagnetic wave can include a first reflected instance of the attenuated instance of the amplified electromagnetic wave reflected from the first unit cell, the first unit cell can be coupled to a second unit cell by the first microstrip line to share the power amplifier and the variable attenuator device, and to the second microstrip line, and the reflected attenuated instance of the amplified electromagnetic wave further can include a second reflected instance of the attenuated instance of the amplified electromagnetic wave reflected from the second unit cell that combines with the first reflected instance reflected from the first unit cell.

The first unit cell can be separated from the second unit cell by a defined distance that facilitates determination of an angle of arrival of the impinging electromagnetic wave.

The variable attenuator device can include controllable switches that select among different resistor networks corresponding to respective different attenuation levels.

One or more example embodiments can be embodied in a device, such as described and represented herein. The device can include a group of unit cells of a reconfigurable intelligent surface, the group of unit cells electrically coupled to signal processing circuitry shared by the group, the signal processing circuitry comprising a power amplifier and a variable attenuator device. Each unit cell of the group of unit cells can include a respective resonating metallic pattern corresponding to a respective resonating frequency, and a respective slotted plane comprising a respective first opening that passes impinging electromagnetic signals to a first contact of a first microstrip line. The first microstrip line can be electrically coupled to an input of the signal processing circuitry to obtain processed electromagnetic signals comprising at least one of: amplified electromagnetic signals, or attenuated electromagnetic signals, and an output of the signal processing circuitry coupled to a second contact of a second microstrip line that passes the processed electromagnetic signals through a respective second opening of the respective slotted plane to the respective resonating metallic pattern to redirect the impinging electromagnetic signals as respective processed electromagnetic signals.

The group of unit cells can include a row of unit cells or a column of unit cells separated from one another by defined distances that facilitate determination of an angle of arrival of the impinging electromagnetic signals.

The group can include a first subgroup arranged as a first modular array of the respective unit cells that can be configured to couple to a second subgroup arranged as a second modular array of the reconfigurable intelligent surface.

The variable attenuator device can include controllable switches that can be controlled by a controller to select among respective resistor networks corresponding to respective different attenuation levels for the attenuated electromagnetic signals.

The controller can control the power amplifier to determine an amplification level of the power amplifier from among different available amplification levels, and the signal processing circuitry can include an impedance matching circuit.

As can be seen, the technology described herein is directed to a device for receiving and reflecting an electromagnetic signal, which can be in the same polarization, by first coupling the RF energy, impedance matching processing, amplifying, and using an attenuation circuit (e.g., switch-based). The seamless monolithic integration of both the dividing and combining circuits (two separate microstrip lines), along with the power supply circuitry, results in a streamlined and organized design. To enhance the effectiveness of RIS in signal transmission, the RIS design incorporates power amplifiers (PAs), bias control, and attenuation integrated within the RIS subarrays. These amplifiers selectively boost the strength of the reflected signal if needed, and if the signal gets distorted due to excessive signal gain, and even with a minimum power amplifier bias control the total gain is still higher than appropriate, an integrated passive attenuator with two multi-port switches allow precise reduction of the signal without adding any non-linearities, unlike active devices. The SPnTs in this example design enable selective attenuation, allowing the RIS to intelligently determine when amplification or attenuation is needed, thereby conserving energy by reducing the power amplifier bias and attenuating the total gain of a sub-array.

Further, the design facilitates the use of only one power amplifier per m×n subarray of the surface's elements, which provides a significant decrease (e.g., 9 times for a 3×3 subarray) in the power amplifier power requirements, leading to significantly reduced costs, reduced power consumption, minimized heat dissipation, lesser signal distortion, and more manageable interference. Still further, the angle of arrival of the incoming signal can be passively determined. The described design achieves a balance between reduced costs, added functionality and system complexity, ensuring that the incorporation of power amplifiers and tunable attenuators into the reconfigurable intelligent surface architecture does not overly complicate the system. In general, the technology described herein not only addresses the previous challenges of signal power loss and double fading, but also provides a flexible and power-efficient method of improving signal quality in wireless networks.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a subgroup of a group of unit cells of a reconfigurable intelligent surface, the subgroup electrically coupled to a power amplifier and variable attenuator device shared by the subgroup, the subgroup configured to:
receive an electromagnetic signal to obtain a received electromagnetic signal;
couple the received electromagnetic signal to a first microstrip line, electrically coupled to the power amplifier, to input the received electromagnetic signal to the power amplifier;
selectively amplify the received electromagnetic signal to output a selectively amplified electromagnetic signal to the variable attenuator device, and selectively attenuate the selectively amplified electromagnetic signal to output a selectively amplified and selectively attenuated signal to a second microstrip line electrically coupled to the variable attenuator device; and
couple the selectively amplified and selectively attenuated electromagnetic signal from the second microstrip line to respective resonating metallic portions of respective unit cells of the subgroup, to combine and redirect the selectively amplified and selectively attenuated electromagnetic signal from the subgroup.

2. The system of claim 1, wherein the variable attenuator device comprises controllable switches that select among different resistor networks based on a control signal.

3. The system of claim 1, wherein the group of unit cells are separated from one another by defined distances that facilitate determination of an angle of arrival of the received electromagnetic signal based on time differential data that is associated with differential phase data corresponding to the angle of arrival.

4. The system of claim 1, wherein the respective unit cells of the subgroup couple the received electromagnetic signal to the first microstrip line via first respective openings of a slotted plane layer, and wherein the respective unit cells of the subgroup couple the selectively amplified and selectively attenuated electromagnetic signal to the respective resonating metallic portions via second respective openings of the slotted plane layer.

5. The system of claim 4, wherein the first respective openings and the second respective openings are hourglass shaped.

6. The system of claim 4, wherein the first respective openings and second respective openings are sized to correspond to a resonating frequency of the respective resonating metallic portions.

7. The system of claim 1, wherein the power amplifier is selectively controlled to adjust a signal amplification level applied via a power amplifier bias control.

8. The system of claim 1, further comprising an impedance matching circuit coupled to the power amplifier.

9. The system of claim 1, wherein the subgroup comprises a two-dimensional array of the respective unit cells.

10. The system of claim 8, wherein the two-dimensional array comprises: four unit cells arranged as two unit cells by two unit cells, nine unit cells arranged as three unit cells by three unit cells, sixteen unit cells arranged as four unit cells by four unit cells, or twenty-five unit cells arranged as five unit cells by five unit cells.

11. The system of claim 8, wherein the two-dimensional array comprises a first number of unit cells in a first dimension that does not equal a second number of unit cells in a second dimension.

12. A unit cell, comprising:
a resonating metallic portion; and
a slotted plane comprising a first opening configured to pass an impinging electromagnetic wave to a first microstrip line coupled to the unit cell, the unit cell coupled to:
a power amplifier that amplifies the impinging electromagnetic wave into an amplified electromagnetic wave, and
a variable attenuator device that attenuates the amplified electromagnetic wave to output an attenuated instance of the amplified electromagnetic wave to a second microstrip line coupled to the unit cell,
wherein the slotted plane further comprises a second opening configured to pass the attenuated instance of the amplified electromagnetic wave from the second microstrip line to the resonating metallic portion to redirect the attenuated instance of the amplified electromagnetic wave as a reflected attenuated instance of the amplified electromagnetic wave.

13. The unit cell of claim 12, wherein the unit cell is a first unit cell, wherein the reflected attenuated instance of the amplified electromagnetic wave comprises a first reflected instance of the attenuated instance of the amplified electromagnetic wave reflected from the first unit cell, wherein the first unit cell is coupled to a second unit cell by the first microstrip line to share the power amplifier and the variable attenuator device, and to the second microstrip line, and wherein the reflected attenuated instance of the amplified electromagnetic wave further comprises a second reflected instance of the attenuated instance of the amplified electromagnetic wave reflected from the second unit cell that combines with the first reflected instance reflected from the first unit cell.

14. The unit cell of claim 13, wherein the first unit cell is separated from the second unit cell by a defined distance that facilitates determination of an angle of arrival of the impinging electromagnetic wave.

15. The unit cell of claim 12, wherein the variable attenuator device comprises controllable switches that select among different resistor networks corresponding to respective different attenuation levels.

16. A device, comprising:
a group of unit cells of a reconfigurable intelligent surface, the group of unit cells electrically coupled to signal processing circuitry shared by the group, the signal processing circuitry comprising a power amplifier and a variable attenuator device; and
each unit cell of the group of unit cells comprising:
a respective resonating metallic pattern corresponding to a respective resonating frequency; and
a respective slotted plane comprising a respective first opening that passes impinging electromagnetic signals to a first contact of a first microstrip line, the first microstrip line electrically coupled to:
an input of the signal processing circuitry to obtain processed electromagnetic signals comprising at least one of: amplified electromagnetic signals, or attenuated electromagnetic signals, and
an output of the signal processing circuitry coupled to a second contact of a second microstrip line that passes the processed electromagnetic signals through a respective second opening of the respective slotted plane to the respective resonating metallic pattern to redirect the impinging electromagnetic signals as respective processed electromagnetic signals.

17. The device of claim 16, wherein the group of unit cells comprises a row of unit cells or a column of unit cells separated from one another by defined distances that facilitate determination of an angle of arrival of the impinging electromagnetic signals.

18. The device of claim 16, wherein the group comprises a first subgroup arranged as a first modular array of the respective unit cells that is configured to couple to a second subgroup arranged as a second modular array of the reconfigurable intelligent surface.

19. The device of claim 16, wherein the variable attenuator device comprises controllable switches that are controlled by a controller to select among respective resistor networks corresponding to respective different attenuation levels for the attenuated electromagnetic signals.

20. The device of claim 19, wherein the controller controls the power amplifier to determine an amplification level of the power amplifier from among different available amplification levels, and wherein the signal processing circuitry comprises an impedance matching circuit.

* * * * *